(12) United States Patent
Morita et al.

(10) Patent No.: US 9,687,805 B2
(45) Date of Patent: Jun. 27, 2017

(54) REACTOR FOR HYDROCARBON SYNTHESIS

(71) Applicant: NIPPON STEEL & SUMIKIN ENGINEERING CO., LTD., Tokyo (JP)

(72) Inventors: Kentarou Morita, Tokyo (JP); Kazuki Murahashi, Tokyo (JP); Eiichi Yamada, Tokyo (JP); Yuzuru Kato, Tokyo (JP); Yoshiyuki Saiwai, Tokyo (JP); Atsushi Murata, Tokyo (JP)

(73) Assignee: NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/908,044

(22) PCT Filed: Jul. 15, 2014

(86) PCT No.: PCT/JP2014/068802
§ 371 (c)(1),
(2) Date: Jan. 27, 2016

(87) PCT Pub. No.: WO2015/016060
PCT Pub. Date: Feb. 5, 2015

(65) Prior Publication Data
US 2016/0160129 A1 Jun. 9, 2016

(30) Foreign Application Priority Data

Jul. 30, 2013 (JP) .................................. 2013-157820

(51) Int. Cl.
*B01J 8/22* (2006.01)
*C10G 2/00* (2006.01)
(Continued)

(52) U.S. Cl.
CPC ................. *B01J 8/22* (2013.01); *B01J 4/004* (2013.01); *B01J 8/1827* (2013.01); *C10G 2/342* (2013.01);
(Continued)

(58) Field of Classification Search
CPC . B01J 8/22; B01J 8/1818; B01J 8/1827; B01J 2208/00911; B01J 2208/0902;
(Continued)

(56) References Cited

U.S. PATENT DOCUMENTS 5,569,434 A * 10/1996 Devanathan ........... B01J 8/1818
208/143
2003/0195264 A1 10/2003 Newton et al.
(Continued)

FOREIGN PATENT DOCUMENTS

JP 2007-197405 A 8/2007
JP 2007-527793 A 10/2007
(Continued)

OTHER PUBLICATIONS

International Search Report, issued in PCT/JP2014/068802, dated Oct. 7, 2014.
(Continued)

*Primary Examiner* — Lessanework Seifu
(74) *Attorney, Agent, or Firm* — Birch, Stewart, Kolasch & Birch, LLP

(57) ABSTRACT

The present invention includes a reactor main body (4) that is formed into a tubular shape having an axis (O) as the center and accumulates a slurry (S); a gas supply line (10) for incorporating a synthesis gas (G) into the reactor main body (4), and a sparger part (5) that is disposed in a lower portion within the reactor main body (4), communicates with the gas supply line (10), and sprays the synthesis gas (G). The sparger part (5) includes a header tube (15) in (Continued)

which a plurality of openings are formed so as to be separated from each other in a first direction and which sprays the synthesis gas (G) from the openings, and a pair of wall surface parts that protrude from the header tube (15), on opposing sides of the plurality of openings and in a direction orthogonal to the first direction.

15 Claims, 5 Drawing Sheets

(51) Int. Cl.
  *B01J 8/18* (2006.01)
  *B01J 4/00* (2006.01)
(52) U.S. Cl.
  CPC ............. *C10G 2/343* (2013.01); *C10G 2/344* (2013.01); *B01J 2208/00902* (2013.01); *B01J 2208/00911* (2013.01)
(58) Field of Classification Search
  CPC ........... B01J 4/004; B01J 4/002; C10G 2/342; C10G 2/343; C10G 2/344
  See application file for complete search history.

(56) References Cited

U.S. PATENT DOCUMENTS

2011/0201697 A1    8/2011  Onishi et al.
2011/0313062 A1*  12/2011  Ruppel .................. B01J 8/1818
                                                    518/700

FOREIGN PATENT DOCUMENTS

| | | |
|---|---|---|
| JP | 2007-530275 A | 11/2007 |
| WO | WO 2005/084790 A1 | 9/2005 |
| WO | WO 2005/094979 A1 | 10/2005 |
| WO | WO 2010/038395 A1 | 4/2010 |

OTHER PUBLICATIONS

Written Opinion of the International Searching Authority, issued in PCT/JP2014/068802, dated Oct. 7, 2014.
Japanese Notice of Allowance dated Apr. 18, 2017, issued in JP 2013-157820, with English translation.

* cited by examiner

REACTOR FOR HYDROCARBON SYNTHESIS

TECHNICAL FIELD

The present invention relates to a reactor used for a hydrocarbon synthesis apparatus.

Priority is claimed on Japanese Patent Application No. 2013-157820 filed on Jul. 30, 2013, the contents of which are incorporated herein by reference.

BACKGROUND ART

In recent years, as one of the methods for synthesizing liquid fuel from natural gas, there is a method of reforming natural gas to produce synthesis gas having carbon monoxide gas and hydrogen gas as main components, and synthesizing hydrocarbons using a catalyst with this synthesis gas as source gas. Such a synthesis reaction is referred to as the Fischer-Tropsch synthesis reaction (hereinafter referred to as "FT synthesis reaction").

Additionally, the Gas-To-Liquids (GTL: liquid fuel synthesis) technique of hydrorefining the hydrocarbons obtained in this way to produce liquid fuel products, such as naphtha (raw gasoline), kerosene, gas oil, and wax has been developed.

In hydrocarbon synthesis apparatuses for the FT synthesis reaction used for this GTL technique, hydrocarbons are synthesized by performing the FT synthesis reaction on the carbon monoxide gas and the hydrogen gas in the synthesis gas inside a bubble column slurry bed reactor in which a slurry having solid catalyst particles suspended in a medium liquid is held. In this case, as the hydrocarbon synthesis apparatuses, upflow types in which the synthesis gas that is a feedstock is introduced from a lower portion of the bubble column slurry bed reactor are used (for example, PTL 1).

Generally, for the purpose of uniformly dispersing a catalyst in a reactor, synthesis gas is sprayed and introduced toward all of the bottom surface of the reactor. The synthesis gas sprayed in this way moves up within the reactor as bubbles, the slurry is stirred by the upward movement energy of the bubbles and a mixed and flowing state of the slurry is maintained.

Meanwhile, a synthesis gas spraying part is constituted of a plurality of header tubes in which openings are formed at equal intervals. Although powdering of the catalyst included in a slurry occurs due to the spraying of the synthesis gas within the reactor (generation of fine powder), this powdering is great at the time of the start of operation, and becomes gradual after the elapse of a certain given time. That is, a shift from initial powdering to steady powdering is made. A shift time is determined depending on the kinetic energy of the synthesis gas spraying into a reaction vessel. If a lot of such fine power is generated, this becomes a cause of blocking a filter that separates the catalyst, and hydrocarbons generated within the reactor.

Meanwhile, if the mesh of the filter is made equal to greater than the size of the fine powder particles in order to avoid the blocking, the powdered catalyst passes through the filter and flows out of the reactor. Therefore, there is a concern that the catalyst may be lost. It is necessary to reduce the kinetic energy of the synthesis gas sprayed into the reactor to a predetermined numerical value in the light of such a problem.

A tubular shroud is attached to each of the openings of the synthesis gas spraying part so as to surround the periphery of the opening. This weakens the momentum of the synthesis gas sprayed from these openings, and the kinetic energy of the synthesis gas is reduced.

CITATION LIST

Patent Literature

[PTL 1] Published Japanese Translation No. 2007-527793 of the PCT International Publication

SUMMARY OF INVENTION

Technical Problem

However, as described above, in the earlier synthesis gas spraying part, a tubular shroud is attached to each of the openings formed in the header tube. Therefore, if the reactor becomes larges, the number of openings is also at the level of several thousand. As a result, the attachment work of the shrouds requires substantial time and effort. Additionally, when the distance between the openings adjacent to each other is small, the next shroud becomes obstructive. As a result, there is a concern that attachment work may become difficult and satisfactory quality may not be obtained.

The invention has been made in consideration of such circumstances, and an object thereof is to provide a reactor for hydrocarbon synthesis that can reduce the momentum of sprayed synthesis gas while achieving facilitation of work.

Solution to Problem

The reactor for hydrocarbon synthesis related to a first aspect of the invention is a reactor for hydrocarbon synthesis that brings a synthesis gas including carbon monoxide gas and hydrogen gas as main components into contact with a slurry having a solid catalyst suspended in liquid hydrocarbons to synthesize hydrocarbons by the Fischer-Tropsch synthesis reaction. The reactor includes a reactor main body that is formed into a tubular shape having an axis as the center and accumulates the slurry; a gas supply line for incorporating a synthesis gas into the reactor main body; and a sparger part that is disposed at a lower portion within the reactor main body, communicates with the gas supply line, and sprays the synthesis gas. The sparger part includes a header tube in which a plurality of openings are formed so as to be separated from each other in a first direction and which sprays the synthesis gas from the openings; and a pair of wall surface parts that are provided to protrude from the header tube, on opposing sides of the plurality of openings and in a direction orthogonal to the first direction.

According to such a reactor, the synthesis gas drawn into the reactor main body through the gas supply line is sprayed downward from the openings of the header tube. Although the synthesis gas from the openings spreads to the outer peripheral sides of openings, the momentum at the time of the spraying is reduced by the synthesis gas colliding against the pair of wall surface parts so that such spreading is limited. The pair of wall surface parts are provided in the header tube so as to sandwich the openings therebetween. For this reason, when the wall surface parts are attached to the header tube, attachment work is very simple, which leads to improvements in attachment precision and shortening of production time for delivery.

Additionally, a plurality of the header tubes may be annularly formed around the axis and be concentrically provided, the plurality of openings may open downward and be formed at a distance from each other in a circumferential direction with respect the axis as the first direction in the header tube, and the pair of wall surface parts may protrude downward from the header tube.

In this case, the pair of wall surface parts are annularly provided so as to sandwich the openings formed at a distance from each other in the circumferential direction from both radial sides with respect to the axis, which leads to simplification of attachment work of the wall surface parts to the header tube, and improvements in attachment precision.

Additionally, a plurality of the header tubes may extend in a horizontal direction orthogonal to the axis and be formed in parallel so as to be separated from each other, the plurality of openings may open downward and be formed at a distance from each other in an extending direction of the header tube as the first direction in the header tube, and the pair of wall surface parts may protrude downward from the header tube.

In this case, the header tube is formed in a so-called comb shape. Therefore, the pair of wall surface parts are provided to extend in the extending direction of the header tube, which leads to simplification of attachment work of the wall surface parts to the header tube and improvements in attachment precision.

Additionally, the pair of wall surface parts may be provided so that the ratio of the separation distance between the pair of wall surface parts to the opening diameter of the openings is 1 to 8 and the ratio of the protruding height of the pair of wall surface parts to the opening diameter is 4 to 10.

By setting the shape of the pair of wall surface parts in this way, the synthesis gas can be made to collide against the pair of wall surface parts effectively.

Moreover, the opening diameter of the openings may be 5 mm, the separation distance between the pair of wall surface parts may be 5 mm to 40 mm, and the protruding height of the pair of wall surface parts may be 20 mm to 50 mm.

By setting the shape of the pair of wall surface parts in this way, the synthesis gas can be made to collide against the pair of wall surface parts effectively.

Additionally, the pair of wall surface parts may be provided so that the ratio of the protruding height of the pair of wall surface parts to the separation distance between the pair of wall surface parts is equal to or greater than 2.5.

By setting the shape of the pair of wall surface parts in this way, the synthesis gas can be made to collide against the pair of wall surface parts effectively.

Advantageous Effects of Invention

According to the present embodiment, by providing the pair of wall surface parts, it is possible to reduce the momentum of the sprayed synthesis gas while achieving facilitation of work.

DESCRIPTION OF EMBODIMENTS

Hereinafter, a reactor for hydrocarbon synthesis (hereinafter simply referred to as a reactor) related to an embodiment of the invention will be described with reference to FIGS. 1 to 5.

Figure 1:
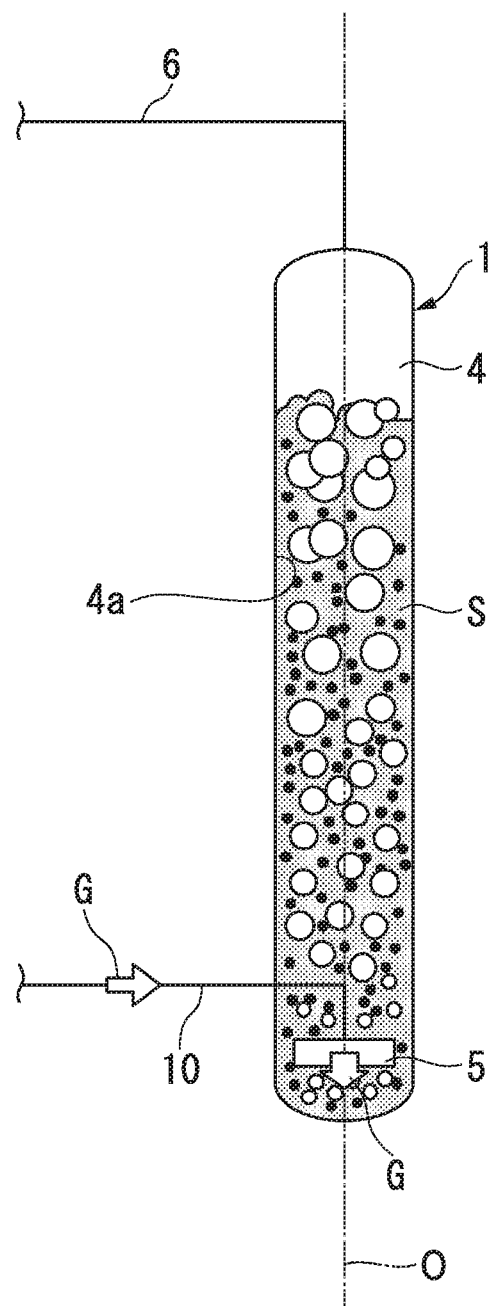
FIG. 1 is an entire front view showing a reactor related to an embodiment of the invention.

A reactor 1 shown in FIG. 1 is a bubble column slurry bed reactor used for plant facilities that execute the GTL process that converts a hydrocarbon feedstock, such as natural gas, into liquid fuel.

In the reactor 1, liquid hydrocarbons are synthesized by the FT synthesis reaction from synthesis gas G including carbon monoxide gas and hydrogen gas, which is produced by reforming natural gas that is a hydrocarbon feedstock. In addition, the liquid hydrocarbons synthesized by the FT synthesis reaction in this way are hydrorefined, and base materials of liquid fuel (mainly kerosene and gas oil) are produced.

As shown in FIG. 1, the reactor 1 mainly includes a reactor main body 4 that is formed in a tubular shape, a gas supply line 10 that incorporates the synthesis gas G into the reactor main body 4, a sparger part 5 that is disposed at a lower portion inside the reactor main body 4, and a discharge line 6 that is connected to an upper portion of the reactor main body 4.

The reactor main body 4 is a substantially cylindrical metallic container having an axis O as a center, and has a slurry S having solid catalyst particles suspended in the liquid hydrocarbons (product of the FT synthesis reaction) accumulated therein. A slurry bed is formed by the slurry S.

The discharge line 6 is connected to the upper portion of the reactor main body 4 so as to draw out the liquid hydrocarbons produced by the reaction within the reactor main body 4, and allows the interior of the reactor main body 4 to communicate outside.

Figure 2:
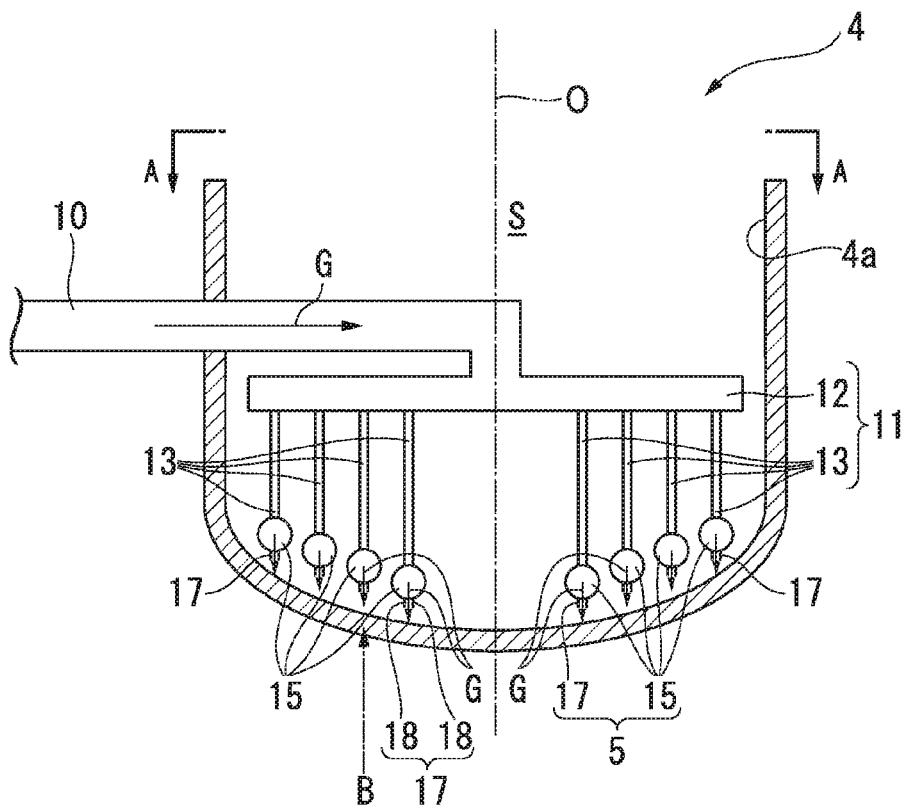
FIG. 2 is a front view showing a sparger part in an enlarged manner regarding the reactor related to the embodiment of the invention.
Figure 3:
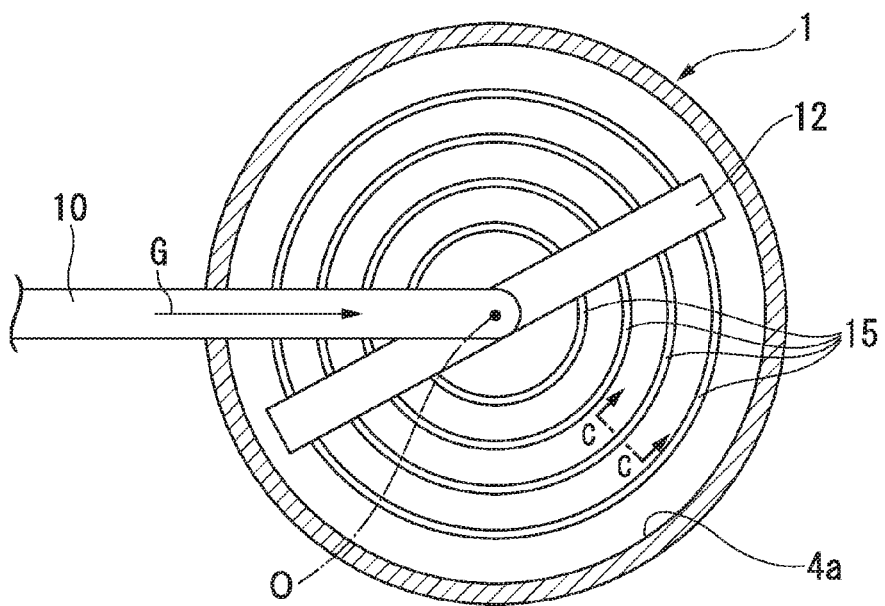
FIG. 3 is a sectional view showing a sparger part in an enlarged manner regarding the reactor related to the embodiment of the invention and is an A-A sectional view of FIG. 2.

As shown in FIGS. 1 to 3, the gas supply line 10 extends in a radial direction with respect to the axis O through the side wall of the reactor main body 4, and has a front end bent downward on the axis O.

Moreover, a connecting tube 11 that communicates with the gas supply line 10 is attached to the front end of the gas supply line 10. The connecting tube 11 has a horizontal tube 12 that is connected to and communicates with the front end of the gas supply line 10 and that extends to a position where the connecting tube 11 does not come into contact with an inner sidewall surface 4*a* of the reactor main body 4 in the radial direction with respect to the axis O.

Moreover, the connecting tube 11 has a plurality of pairs of vertical tubes 13 that are connected at a distance from each other in the radial direction so as to be symmetrical to each other on a radial outer side with the axis O interposed therebetween in the radial direction with respect to the axis O, communicate in pairs with the horizontal tube 12, and extend downward. That is, the plurality of pairs of vertical tubes 13, which are arranged so as to be symmetrical to each other in the radial direction with the axis O interposed therebetween, are connected to the horizontal tube 12 at a distance from each other in the radial direction with respect to the axis O.

Next, the sparger part 5 will be described.

As shown in FIGS. 2 to 5, the sparger part 5 has a plurality of header tubes 15 that communicate with the vertical tubes 13 of the connecting tube 11 and are annularly formed around the axis O, and shrouds 17 that are respectively provided at the header tubes 15.

The plurality of header tubes 15 are concentrically provided around the axis O. Each header tube 15 is connected to lower ends of a pair of corresponding vertical tubes 13, and communicates with the connecting tube 11.

Moreover, a plurality of openings 16 that open downward are formed at a distance from each other in a circumferential direction (first direction) with respect to the axis O in the header tube 15. The synthesis gas G from the gas supply line 10 is introduced into the header tube 15 via the connecting tube 11 and is sprayed downward from the openings 16.

Figure 4:
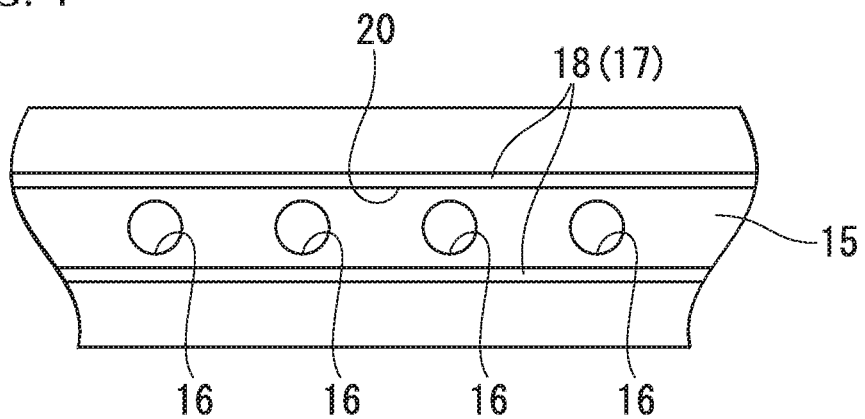
FIG. 4 is a view showing a portion of a header tube in the sparger part in an enlarged manner regarding the reactor related to the embodiment of the invention and is a view as seen from arrow B of FIG. 2.
Figure 5:
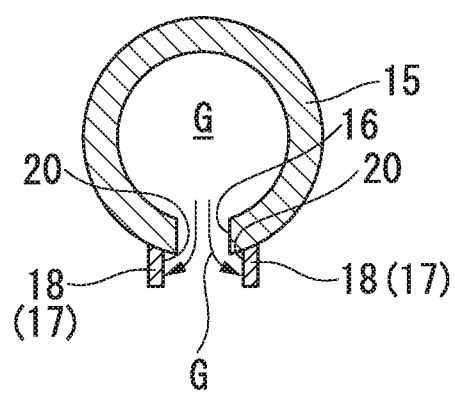
FIG. 5 is a sectional view showing a header tube in the sparger part regarding the reactor related to the embodiment of the invention and is a view showing a C-C section of FIG. 3.

As shown in FIGS. 4 and 5, the shroud 17 has a pair of plate-shaped parts 18 that are annularly formed around the axis O. The pair of plate-shaped parts 18 are provided so as to sandwich the plurality of openings 16 in each header tube 15 from both radial sides with respect to the axis O orthogonal to the circumferential direction and are provided so as not to interfere with the openings 16.

The shroud 17 is attached to the header tube 15 by welding or the like so that the pair of plate-shaped parts 18 protrude in parallel in the vertical direction downward from a lower portion of the header tube 15. Inner surfaces of the shroud 17 that face the openings 16 serve as wall surface parts 20.

In such a reactor 1, the synthesis gas G drawn into the reactor main body 4 through the gas supply line 10 from outside is sprayed downward from the openings 16 of the header tube 15. In this case, the synthesis gas G from the openings 16 is radially sprayed so as to spread to the outer peripheral sides of the openings 16.

Then, the synthesis gas G sprayed from the openings 16 collides against the wall surface parts 20 of the shroud 17 so that the spreading to the outer peripheral sides is limited. Therefore, since the momentum of the synthesis gas G at the time of the spraying can be reduced due to the energy at the time of the spraying being absorbed due to the collisions, damage to the catalyst in the slurry S can be reduced.

Here, in each header tube 15, the plate-shaped parts 18 in the shroud 17 are annularly provided so as to sandwich the opening 16 from both radial outer sides. For this reason, when the wall surface parts 20 are attached to the header tube 15, the time and effort required for the attachment can be reduced compared to a related-art case where a member that covers each opening 16 from the outer peripheral side of the opening 16 is provided as a shroud.

Additionally, in the related-art case where the member serving as a shroud is individually attached to each opening 16, a member already attached to the adjacent opening 16 becomes an obstacle to attachment of a new member, and the attachment becomes difficult.

However, from this point, in the present embodiment, the shroud 17 having the annular plate-shaped parts 18 is attached. Therefore, such a problem does not occur. Therefore, attachment work is very simple, which leads to improvement in attachment precision.

Moreover, the synthesis gas G molecules sprayed from the openings 16 adjacent to each other collide against each other in the circumferential direction of the axis O due to such a shroud 17. The energy at the time of the sprayed synthesis gas G can be reduced also by such collisions in the synthesis gas G.

As described above, according to the reactor 1 of the present embodiment, the shrouds 17 that are annularly formed are used. Thus, it is possible to reduce the momentum of the sprayed synthesis gas G while achieving facilitation of work. As a result, damage to the catalyst in the slurry S can be reduced.

Hereinafter, a modification example of the shroud 17 in the above embodiment will be described.

Figure 6:
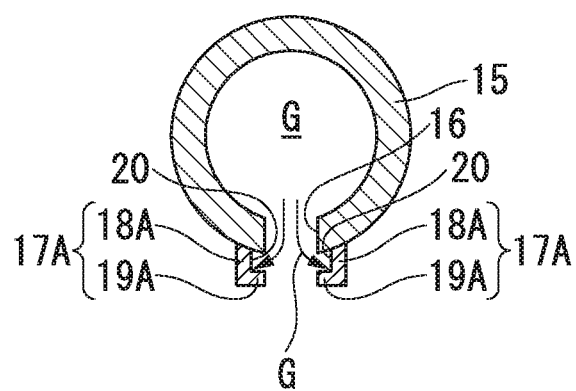
FIG. 6 is a sectional view showing a header tube in a sparger part regarding a reactor related to a first modification of the embodiment of the invention and is a view showing a section at the same position as that of the C-C section of FIG. 3.

As shown in FIG. 6, a shroud 17A in each header tube 15 may have a pair of plate-shaped parts 18A that extend downward in the vertical direction, and bent plate-shaped parts 19A that are formed integrally with lower ends of the pair of plate-shaped parts 18A and that extend so as to be bent in the radial direction with respect to the axis O from the plate-shaped parts 18A so as to approach each other.

According to such a shroud 17A, the synthesis gas G, which has collided against inner surfaces (wall surface parts 20) of the plate-shaped parts 18A, also collides against inner surfaces of the bent plate-shaped parts 19A, which leads to further reduction of the energy at the time of the sprayed synthesis gas G. Therefore, the momentum of the sprayed synthesis gas G can be more effectively reduced.

Figure 7:
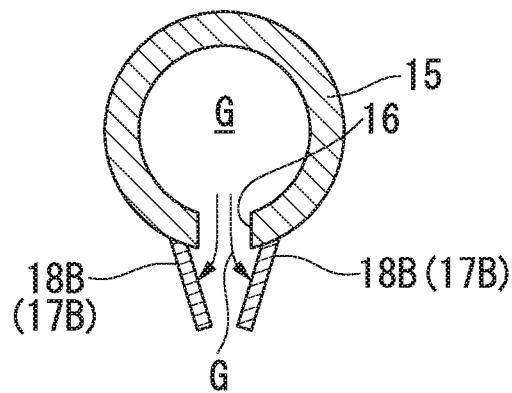
FIG. 7 is a sectional view showing a header tube in a sparger part regarding a reactor related to a second modification of the embodiment of the invention and is a view showing a section at the same position as that of the C-C section of FIG. 3.

Additionally, as shown in FIG. 7, a shroud 17B in each header tube 15 may be provided so that a pair of plate-shaped parts 18B are inclined in the radial direction with respect to the axis O while approaching each other as they become closer to a lower side from a part connected to the header tube 15, that is, narrow toward their tips.

In addition, also in this case, the bent plate-shaped parts 19A may be provided at the plate-shaped parts 18B.

Additionally, if molecules of the sprayed synthesis gas G can collide against each other, in contrast to the case of FIG. 7, the pair of plate-shaped parts 18B may be inclined in the radial direction with respect to the axis O while moving away from each other as they become closer to the lower side from the part connected to the header tube 15, that is, widen toward their tips.

In addition, also in this case, the bent plate-shaped parts 19A may or may not be provided at the plate-shaped parts 18B.

Moreover, the pair of plate-shaped parts 18 in the shroud 17 may not be formed in a plate shape as described above, or may be formed in a block shape instead of the plate shape.

That is, the shroud 17 has only to be a member in which the wall surface parts 20 annularly formed around the axis O are provided at least in the portions thereof that face the openings 16 so that the collision of the synthesis gas G from the openings 16 is allowed.

Additionally, the shrouds 17 (17A, 17B) may not be provided at all the header tubes 15, and for example, may be alternately provided at the header tubes 15.

When the operation of a plant facility is started, the energy at the time of the sprayed synthesis gas G is smaller compared to that at the time of a steady operation. Therefore, by providing the shrouds 17 in this way, the energy at the time of the sprayed synthesis gas G is not excessively reduced, and the momentum at the time of the sprayed synthesis gas G can be effectively reduced.

Figure 8:
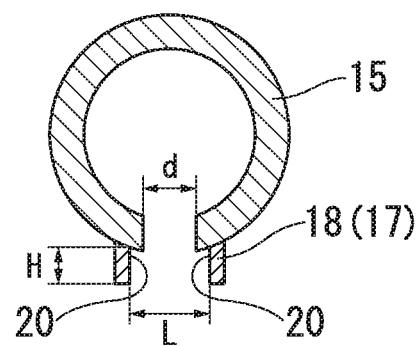
FIG. 8 is a sectional view showing a header tube in a sparger part regarding a reactor related to a third modification of the embodiment of the invention and is a view showing a section at the same position as that of the C-C section of FIG. 3.

As shown in FIG. 8, it is preferable that the shroud 17 is provided so that the ratio of the separation distance L (the spacing between the pair of wall surface parts 20 in the radial direction with respect to the axis O) between the pair of wall surface parts 20 to the opening diameter d of the openings 16 is 1 to 8 and so that the ratio of the protruding height H of the pair of wall surface parts 20 to the opening diameter d of the openings is 4 to 10.

More specifically, it is preferable that the shroud 17 is provided so that the separation distance L between the pair of wall surface parts 20 is 5 mm to 40 mm and the protruding height H of the pair of wall surface parts 20 is 20 mm to 50 mm, when the opening diameter d of the openings 16 in the header tube 15 is 5 mm.

By setting the pair of wall surface parts 20 in the shroud 17 to have such dimensions, the synthesis gas G can be made to collide against the pair of wall surface parts 20 effectively, and the momentum of the sprayed synthesis gas G can be more effectively reduced.

Moreover, it is preferable that the shroud 17 is provided so that the ratio of the protruding height H of the pair of wall surface parts 20 to the separation distance L between the pair of wall surface parts 20 is equal to or greater than 2.5. By setting the pair of wall surface parts 20 to have such dimensions, the synthesis gas G can be made to collide against the pair of wall surface parts 20 effectively.

Although the embodiment of the invention has been described above in detail, some design changes can also be made without departing from the technical idea of the invention.

Figure 9:
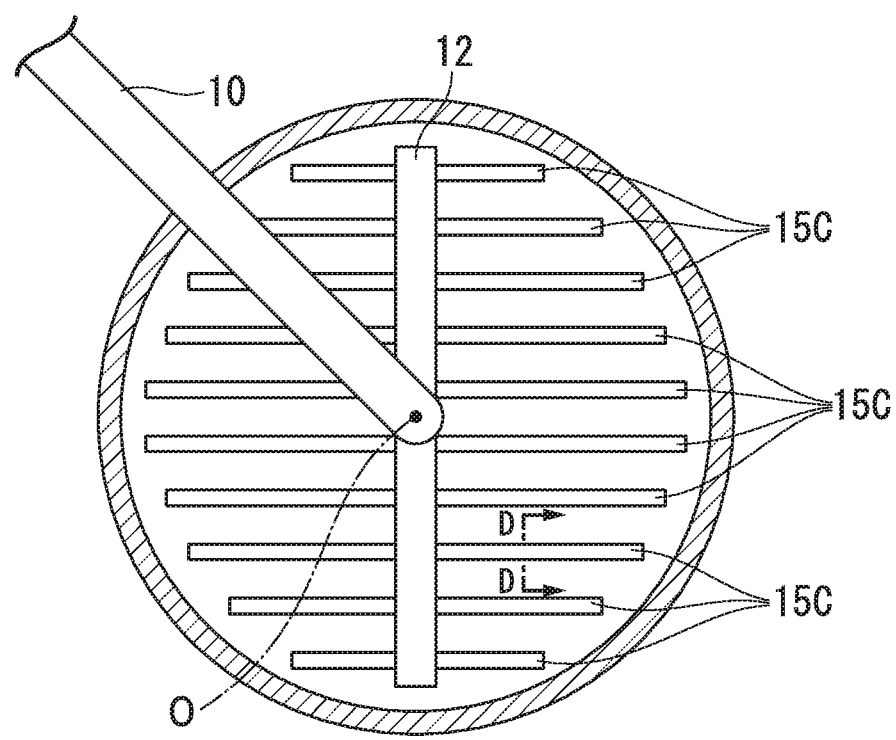
FIG. 9 is a sectional view showing a sparger part in an enlarged manner regarding a reactor related to a fourth modification example of the embodiment of the invention and is a view showing a section at the same position as the A-A section of FIG. 2.

For example, as shown in FIG. 9, even when the header tube has the so-called comb structure, it is possible to apply the above-described shroud 17 (17A, 17B).

Specifically, the plurality of header tubes 15C extend on a horizontal plane in a direction orthogonal to the horizontal tube 12, and are provided at a distance from each other in the extending direction of the horizontal tube 12.

Figure 10:
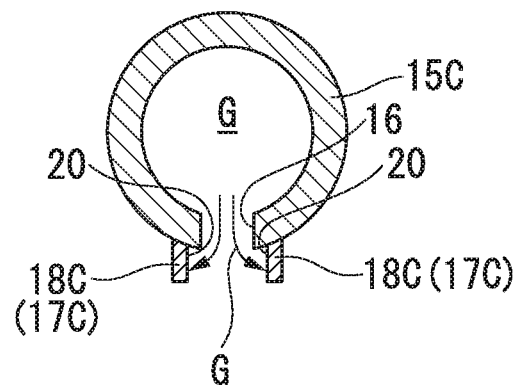
FIG. 10 is a sectional view showing a header tube in the sparger part regarding the reactor related to the fourth modification example of the embodiment of the invention and is a view showing a D-D section of FIG. 9.

As shown in FIG. 10, the plurality of openings 16 that open downward are formed over the entire region in the direction (first direction) in which the header tubes 15C extend at a distance from each other in this direction in each of the header tubes 15C.

Moreover, the plate-shaped parts 18C of the shroud 17C are provided so as to protrude downward from the header tube 15C and sandwich the opening 16 from both sides in the extending direction of the horizontal tube 12.

INDUSTRIAL APPLICABILITY

According to the present embodiment, by providing the pair of wall surface parts, it is possible to reduce the momentum of the sprayed synthesis gas while achieving facilitation of work. Accordingly, the invention has industrial applicability.

REFERENCE SIGNS LIST

1: REACTOR (REACTOR FOR HYDROCARBON SYNTHESIS)
4: REACTOR MAIN BODY
4a: INNER SIDEWALL SURFACE
5: SPARGER PART (SPARGER PORTION)
6: DISCHARGE LINE
10: GAS SUPPLY LINE
11: CONNECTING TUBE
12: HORIZONTAL TUBE
13: VERTICAL TUBE
15 15C: HEADER TUBE
16: OPENING
17, 17A, 17B, 17C: SHROUD
18, 18A, 18B, 18C: PLATE-SHAPED PART
19A: BENT PLATE-SHAPED PART
20: WALL SURFACE PART
G: SYNTHESIS GAS
S: SLURRY
O: AXIS

What is claimed is:

1. A reactor for hydrocarbon synthesis that brings a synthesis gas including carbon monoxide gas and hydrogen gas as main components into contact with a slurry having a solid catalyst suspended in liquid hydrocarbons to synthesize hydrocarbons by the Fischer-Tropsch synthesis reaction, the reactor comprising:
    a reactor main body that is formed into a tubular shape having an axis as the center and accumulates the slurry;
    a gas supply line for incorporating a synthesis gas into the reactor main body; and
    a sparger part that is disposed at a lower portion within the reactor main body, communicates with the gas supply line, and sprays the synthesis gas;
    wherein the sparger part includes:
    a header tube in which a plurality of openings are formed so as to be separated from each other in a first direction and which sprays the synthesis gas from the openings; and
    a pair of wall surface parts that are provided to protrude from the header tube, on opposing sides of the plurality of openings and in a direction orthogonal to the first direction.

2. The reactor for hydrocarbon synthesis according to claim 1,
    wherein a plurality of the header tubes are annularly formed around the axis and are concentrically provided;
    wherein the plurality of openings open downward and are formed at a distance from each other in a circumferential direction of the axis as the first direction in the header tube; and
    wherein the pair of wall surface parts protrude downward from the header tube.

3. The reactor for hydrocarbon synthesis according to claim 1,
    wherein a plurality of the header tubes extend in a horizontal direction orthogonal to the axis and are formed in parallel so as to be separated from each other;

wherein the plurality of openings open downward and are formed at a distance from each other in an extending direction of the header tube as the first direction in the header tube; and wherein the pair of wall surface parts protrude downward from the header tube.

4. The reactor for hydrocarbon synthesis according to claim 1, wherein the pair of wall surface parts are provided so that the ratio of the separation distance between the pair of wall surface parts to the opening diameter of the openings is 1 to 8 and the ratio of the protruding height of the pair of wall surface parts to the opening diameter is 4 to 10.

5. The reactor for hydrocarbon synthesis according to claim 1, wherein the opening diameter of the openings is 5 mm;

wherein the separation distance between the pair of wall surface parts is 5 mm to 40 mm; and wherein the protruding height of the pair of wall surface parts is 20 mm to 50 mm.

6. The reactor for hydrocarbon synthesis according to claim 1, wherein the pair of wall surface parts are provided so that the ratio of the protruding height of the pair of wall surface parts to the separation distance between the pair of wall surface parts is equal to or greater than 2.5.

7. The reactor for hydrocarbon synthesis according to claim 2, wherein the pair of wall surface parts are provided so that the ratio of the separation distance between the pair of wall surface parts to the opening diameter of the openings is 1 to 8 and the ratio of the protruding height of the pair of wall surface parts to the opening diameter is 4 to 10.

8. The reactor for hydrocarbon synthesis according to claim 3, wherein the pair of wall surface parts are provided so that the ratio of the separation distance between the pair of wall surface parts to the opening diameter of the openings is 1 to 8 and the ratio of the protruding height of the pair of wall surface parts to the opening diameter is 4 to 10.

9. The reactor for hydrocarbon synthesis according to claim 2, wherein the opening diameter of the openings is 5 mm;

wherein the separation distance between the pair of wall surface parts is 5 mm to 40 mm; and wherein the protruding height of the pair of wall surface parts is 20 mm to 50 mm.

10. The reactor for hydrocarbon synthesis according to claim 3, wherein the opening diameter of the openings is 5 mm;

wherein the separation distance between the pair of wall surface parts is 5 mm to 40 mm; and wherein the protruding height of the pair of wall surface parts is 20 mm to 50 mm.

11. The reactor for hydrocarbon synthesis according to claim 4, wherein the opening diameter of the openings is 5 mm;

wherein the separation distance between the pair of wall surface parts is 5 mm to 40 mm; and wherein the protruding height of the pair of wall surface parts is 20 mm to 50 mm.

12. The reactor for hydrocarbon synthesis according to claim 2, wherein the pair of wall surface parts are provided so that the ratio of the protruding height of the pair of wall surface parts to the separation distance between the pair of wall surface parts is equal to or greater than 2.5.

13. The reactor for hydrocarbon synthesis according to claim 3, wherein the pair of wall surface parts are provided so that the ratio of the protruding height of the pair of wall surface parts to the separation distance between the pair of wall surface parts is equal to or greater than 2.5.

14. The reactor for hydrocarbon synthesis according to claim 4, wherein the pair of wall surface parts are provided so that the ratio of the protruding height of the pair of wall surface parts to the separation distance between the pair of wall surface parts is equal to or greater than 2.5.

15. The reactor for hydrocarbon synthesis according to claim 5, wherein the pair of wall surface parts are provided so that the ratio of the protruding height of the pair of wall surface parts to the separation distance between the pair of wall surface parts is equal to or greater than 2.5.

* * * * *